ARRANGEMENT FOR THE FASTENING AND CONTACTING OF A LAMINATED CONDUCTOR PLATE IN A SHIELD CASING

Filed Feb. 14, 1966 2 Sheets-Sheet 1

INVENTORS
Hans Donath
Gerd Nothnagel
BY Spiel & Spiel
ATTYS.

INVENTORS
*Hans Donath*
*Gerd Nothnagel*
BY *[signature]*
ATTYS.

United States Patent Office 3,407,261
Patented Oct. 22, 1968

3,407,261

ARRANGEMENT FOR THE FASTENING AND CONTACTING OF A LAMINATED CONDUCTOR PLATE IN A SHIELD CASING

Hans Donath and Gerd Nothnagel, Munich, Germany, assignors to Siemens Aktiengesellschaft, a corporation of Germany Filed Feb. 14, 1966, Ser. No. 527,344
Claims priority, application Germany, Feb. 16, 1965, S 95,464
12 Claims. (Cl. 174—35)

ABSTRACT OF THE DISCLOSURE

An arrangement for securing and supporting a circuit board in a shielded casing using an intermediate frame member. The circuit board has a metallized ground strip along at least one edge. The frame member is soldered to both the ground strip and the shield casing to electrically interconnect the ground to the casing. The frame member of one embodiment has an obliquely extending flange contacting the wall of the casing. The angle of the flange is the same as the angle of which the stream of flowing solder is projected on the arrangement to facilitate the soldering of the frame to both the ground strip and the casing.

The invention relates to an arrangement for the fastening and contacting of a laminated or multiply conductor plate or board in a shield casing, especially for units comprising groups of structural components in the field of electrical communications and measuring.

Present technology prefers the construction of units, according to electrical communications technology, out of individual enclosed structural groups, in which there are enclosed a number of mainly small structural elements, together with amplifier elements, for example transistors, in the form of a printed circuit which provides a unit more or less capable of independent functioning. Such a unit frequently forms an intermediate frequency amplifier, demodulator or the like. For the avoidance of stray couplings over electromagnetic fields, particularly such as can occur in the case of structural units carrying high frequency, a careful shielding of the structural unit is necessary. Generally the conductor board is completely enclosed in a metal casing and is operatively connected over shielded or high-frequency-blocking plugs. In the accommodation of the conductor board in the casing there frequently arise great difficulties with respect to a faultless contacting of the ground connections on the conductor board with the shield casing, particularly where an efficient manufacture is required, that is, a manufacture largely free of hand work, such as is often necessary with such structural units, since such units must be produced in very large numbers.

The invention has as its basic problem that of overcoming, with simple means, the particular difficulties enumerated.

This problem is solved according to the invention, in an arrangement for the fastening and contacting of a laminated or multi-layer conductor board or plate in a shield casing, especially for structural units, utilizing electrical communications and measuring technology, in which the soldering side of the conductor board is provided with at least one narrow metalized strip serving as the ground connection therefor, which is connected with the shield casing by an arrangement in which there is disposed, adjacent the edge of the board, an additional relatively narrow frame constructed of well-solderable sheet metal which is thin as compared to the wall thickness of the shield casing, and which possibly may be made up of several pieces. The frame is secured in the relatively rigid shield casing, which is open on at least one side, adjacent to the open edge thereof and is so formed that one portion of the frame overlies the edge of the metalized strip, and another portion of the frame, angularly disposed thereto, closely engages the adjacent wall of the shield casing. The frame is soldered to the casing and the ground strip of the board preferably by a flood or wash soldering of the whole unit.

A form of the frame suitable for most applications consists of a U-shaped piece of sheet metal which is "tacked" to the casing by spot welding of the intermediate connecting portions between the two leg portions thereof. In closed casings it is usually necessary to construct one wall of the casing together with the corresponding frame part as an individual sub-assembly and, following insertion of the conductor board by sliding it into the U-tracks formed by the frame elements, to simultaneously close the frame and the casing.

Another favorable arrangement comprises a frame member which has an L-shaped transverse cross-section, whose one leg bears against the metalized strip, while the other leg bears against the casing wall and is provided with tabs which are inserted in inwardly extending sheet metal bows or eyes struck out of the casing walls and bent or twisted at their free ends to provide an interlock with the casing. The bows or eyes also form stops for engagement with the conductor board to restrict inward movement of the latter within the casing. Where the frame is constructed with a U-shaped cross-section the tabs expediently may be formed from the adjacent leg of the frame.

If it is desirable, for the avoidance of the formation of short-circuits of the structural components by the shield cover, or for other reasons, to inset the conductor boards somewhat deeper into the casing, it is expedient to provide, on the portions of the frame extending parallel to the solder flow, an additional sheet metal leg or flange which is obliquely bent back from the inner edge of the frame, and extends to the adjacent casing edge, preferably with an inclination which corresponds approximately to the discharge angle of the solder flow during the soldering operation. It is also advantageous to so bend over the free edge of the oblique flange whereby there is formed a narrow strip or flange which bears upon the casing.

For many applications it is expedient to surround the conductor board with a closed frame and to effect its attachment in the casing by means of tabs and screws or the like.

In the following, the invention is explained in detail with the aid of the drawings which illustrate several examples of construction and in which.

Figure 1:
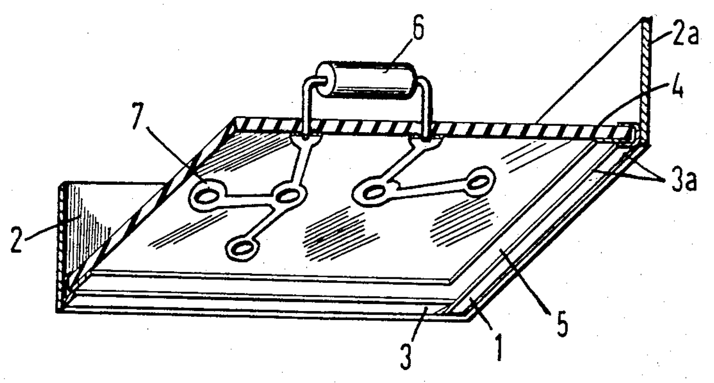
FIG. 1 is a perspective view of a corner portion of a conductor plate and shield casing illustrating details of the connection therebetween.

Referring to FIG. 1, a portion of a laminated or multiply conductor board or plate is designated by the reference numeral 4, which is mounted in a shield casing having walls 2 and 2$a$. For the sake of clearer representation of the units, which normally are completely enclosed are only partially illustrated in the figures, for example, without a cover, a bottom, intermediate walls and other parts not necessary for an understanding of the invention. The laminated conductor board is provided with conductive wiring 7 in the form of a printed circuit, which in this case is disposed on the underside of the conductor board. In the arrangement according to the invention such conductor board can be circuited on both sides, i.e., provided with conductive circuitry. A structural component on the upper side of the conductor board is designated by the reference numeral 6 and generally represents the equipping of the conductor board. The conductor board has a conductive metalized layer 5 extending around the entire border which is to be connected to ground. For this purpose it is encircled by an elongated, relatively narrow U-shaped frame 3, which is fabricated from a thin, easily solderable metal strip. Since, as will subsequently be explained in detail, the frame 3 is secured to the side walls of the casing, with at least one side portion of the frame, together with the associated side wall of the casing being constructed as a separate individual sub-assembly. The frame is attached prior to the introduction of the conductor board directly to the lower edge of the frame-like shield casing, for example by spot welding of abutting portions. The conductor board is then slid into the frame from the open side of the casing, with the frame being closed or completed by the individual piece 1, which is previously attached to the associated sheet metal wall 2$a$ of the casing. As a result of this arrangement there result two gaps or joints 3$a$, which are filled by means of a soldering operation, in particular by immersion soldering, for example, a flood or wash soldering. The soldering is normally best carried out simultaneously with the connection of the structural components to the conductor board. The frame can also be attached somewhat inset from the lower edge of the shield casing. The difficulties resulting therefrom under some circumstances, especially in connection with a flood soldering can be overcome by an additional alternation of the frame, as subsequently described.

Figure 2:
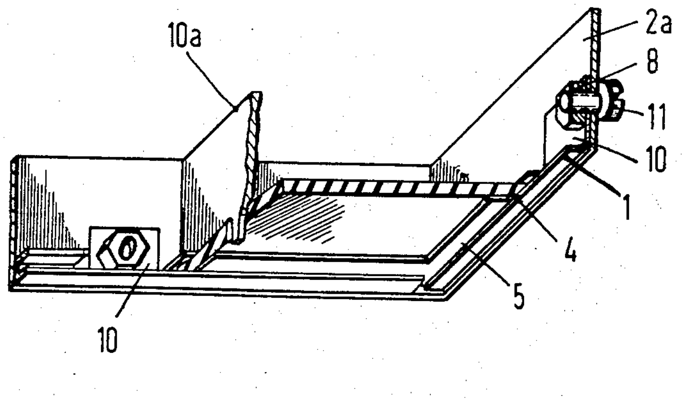
FIG. 2 is a view similar to FIG. 1, illustrating a modified construction utilizing a partition wall.

Another example of construction is illustrated in FIG. 2. In structural groups which are provided with intermediate shield partitions or walls, such a wall being indicated in FIG. 2 as 10$a$, the first mentioned method of fastening the frame is not always possible in a simple manner. In such cases an arrangement achieves the desired results, in which the frame, which already encloses the entire conductor board, is subdivided and can be slid into the casing frame assembled with the conductor board and subsequently secured. For the purpose, in the arrangement according to FIG. 2, small tabs 10 are formed from the upward extending leg or flange of the U-shaped frame strip, which engage the casing walls and are provided with holes for the reception of screws 11. Expediently, the nuts 8 for such screws are securely fastened to the tabs, for example, by utilizing rivet nuts. The attachment of the frame can, for example, also be effected by the use of rivets. The intermediate shield walls 10$a$ can, with this method, be soldered, by a previous operation, into the shield casing 2 or attached in any other manner, which offers a further simplification of the manufacture. The parts 1, 2$a$, 4 and 5 are constructed in the same maner as those described with respect to FIG. 1. The frame is illustrated in this figure in divided form, although such a division is not required.

Figure 3:
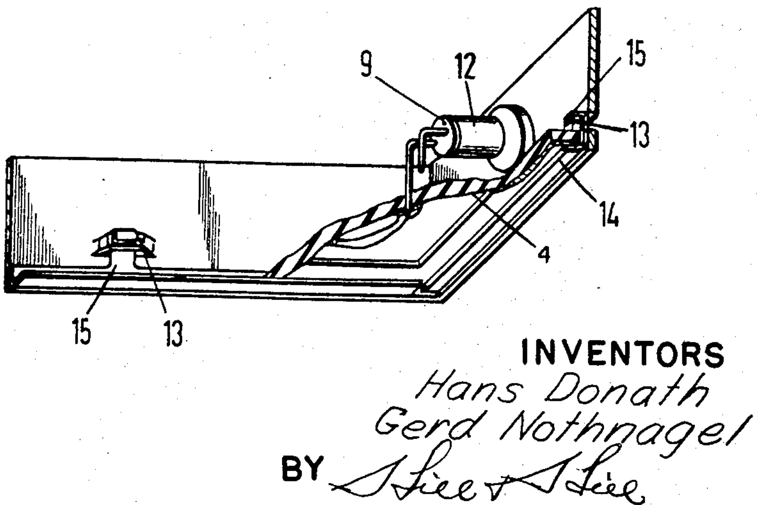
FIG. 3 is a view similar to FIG. 1, illustrating a further modification of the construction of FIG. 1.

A further simplification of the arrangement according to the invention, applicable in many cases can be achieved by a design according to FIG. 3, in which the frame 14 has an L-shaped cross section. On its walls engaging the inner face of the casing there are provided small retaining tabs 15. For the reception of such retaining tabs there are struck inwardly out of the casing, narrow, bow-shaped metal strips 13 forming eyes, into which the retaining tabs 15 are inserted and locked in position by bending or twisting the free ends thereof. In this example of construction the complete frame holding the conductor board is slid into the closed casing until it is restricted by engagement of the conductor board against the member 13, whereupon the previously mentioned attachment of the frame is effected by the bending or twisting of the retaining tabs 15. This solution is especially suitable for casings which are provided with intermediate shield walls or partitions. In this example of construction there is represented, furthermore, a transistor 9, and its terminals, which is connected with the casing by a heat sink or conductor 12. Such structural elements fastened to the casing wall can be provided in all the examples of construction illustrated, but the fastening of structural elements to the casing is especially favorable for effecting a cooling of structural elements which are highly loaded thermally, such as transistors and the like. The soldering of the entire system again can be accomplished as in the constructions of the preceding figures. The other individual parts remain the same as corresponding parts in the preceding figures.

Figure 4:
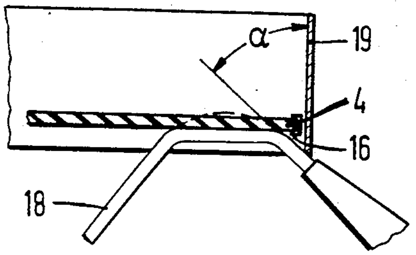
FIG. 4 is a transverse sectional view through a conductor plate and adjacent casing wall, illustrating the use of a flood or wash soldering operation.
Figure 5:
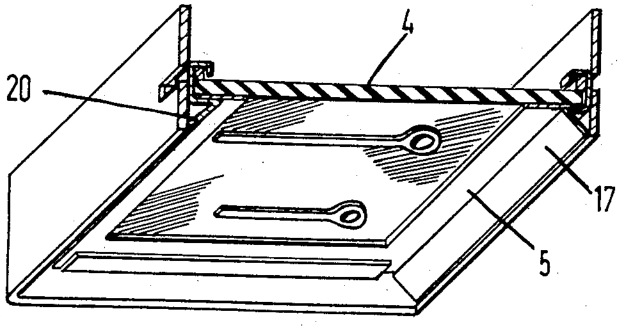
FIG. 5 is a perspective view of a portion of a conductor plate and shield casing, illustrating a further modification which enables an efficient soldering of the respective components.

FIG. 4 illustrates the manner in which a flood soldering may take place with the described arrangement. If it should be desirable or necessary to mount the conductor board 4 somewhat deeper into the casing, it can occur in the case of flood soldering, that the frame part 16, which in the advancing of the unit against the flow of solder first approaches the latter (leading side) is not soldered or is incompletely soldered to the side wall 19, since it lies in the dead angle of the solder flow 18. This can be avoided, according to a further feature of the invention, by an arrangement such as that illustrated in FIG. 5, in which the part of the frame disposed at this side is provided with an angularly extending flange 17, which is bent back as far as the casing edge. Thereby also in these cases a good joining of the frame with the casing side mentioned is achieved with a flood soldering. For the avoidance of eddy formations and undesired deflection of the solder flow on the casing wall lying opposite the leading side (the trailing side) it is likewise of advantage to there provide an oblique flange on the frame thereof, corresponding to that at the leading side. Thereby, there is also achieved on this side a good soldering without eddy formation and similar troublesome side phenomena. In FIG. 5 such frame part is designated by the reference numeral 20, numerals 4 and 5 representing parts previously described under like designations.

Figure 6:
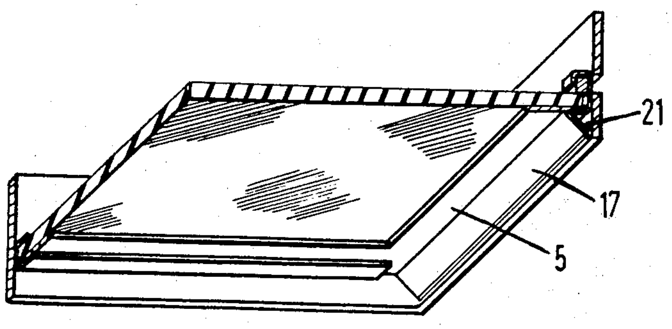
FIG. 6 is a perspective view of a corner portion of a conductor plate and casing wall, utilizing the construction of FIG. 5, illustrating an additional feature.

A still further improved construction of the corresponding frame portion is illustrated in FIG. 6. The flange 17 (its counterpart not being illustrated) in this case is provided with an additional narrow flange 21, which bears on the casing wall. The inclination of the flange 17, in both cases, is such that it corresponds approximately to the emergence angle $\alpha$ of the solder flow. The use of the oblique flange is intended primarily for use with flood soldering and can be omitted in general in the case of other soldering processes. Such flange can be provided in all of the illustrated constructions of the frame.

The invention has the advantage that the dimensions of the conductor board and of the casing can be given coarse tolerances, since any uneven resulting gap, which would otherwise occur between conductor board and casing wall, is bridged by conductive frame portions which extend over a part of the metalized ground strips. The resultant soldering gaps or joints (3$a$ in FIG. 1) are very uniform and so narrow that even in the case of a brief flowing thereover of the soldering agent a faultless contacting takes place. This is particularly true of the arrangements illustrated in FIGS. 5 and 6, in which the frame has a flange bent toward the casing wall. This has, especially in the case of these sides which lie transversely to the solder flood, the special advantage that without any attendant disadvantages in the soldering process, the conductor board can be inset somewhat with respect to the edge of the casing.

The other narrow flange (21 in FIG. 6) bearing against the casing wall produces a stiffening of the edge of the flange 17 of FIG. 6, since this could otherwise be distorted in the assembling or in the heating thereof during the soldering process. Moreover, by means of this tab 21 a good capillary effect is achieved for the soldering agent between the frame parts and the casing wall, through which the soldering agent penetrates with certainty into the soldering gap there present.

The whole arrangement in addition has the advantage that the conductor board can expand without hindrance and without tension during the soldering process, thus assuring a faultness soldering connection on all sides. The invention can be utilized in all shielded structural groups of the type initially mentioned, as well as in all similar installations.

Changes may be made within the scope and spirit of the appended claims which define what is believed to be new and desired to have protected by Letters Patent.

We claim:

1. An arrangement facilitating the fastening and contacting of the laminated conductor board in a shield casing, especially for a structural component sub-assemblies in electrical communication and measuring technology, comprising a conductor board having at the soldering side thereof at least one narrow metalized strip serving as a ground connection, a relatively rigid shield casing having wall means disposed at the edges of said board, said casing being opened on at least one side thereof with said conductor board extending thereacross, frame means disposed between said board and said casing, said frame means having a first portion extending in the same direction as the adjacent casing wall and lying snugly thereagainst, said frame means having a second portion extending transversely to said first portion, said second portion engaging said metalized strip on said board and supporting said board in said shield casing, said frame means being constructed of well-solderable sheet metal which is thin as compared with the thickness of the casing wall, solder joints conductively connecting said frame means to said casing and said frame means to said metalized strip forming a ground connection between said metalized strip, said frame means and said casing, and additional means fastening said frame means to an inner surface of said shield casing.

2. An arrangement according to claim 1, wherein said addition means for fastening comprises upstanding tabs on said frame means secured to said inner face of said casing.

3. An arrangement according to claim 2, wherein said wall means of the casing includes inwardly extending strip portions forming eyes in alignment with said tabs of said frame, said tabs being received and locked in said eyes with an upper edge of said board in contact with an eye whereby said eye limits the insertion of said board and frame means into said casing shield.

4. An arrangement according to claim 1, wherein said frame means includes an additional portion extending transversely to said first portion to define a frame means having a U-shaped cross section, said additional means fastening said frame to said casing including said first portion being spot welded to said wall means.

5. An arrangement according to claim 1, wherein said frame means has additional portions extending transversely to said first portion of said frame means engaging a surface of said board opposite said soldering side to define a U-shaped cross section, said additional portions being interrupted by upstanding tabs, said wall means of said casing having inwardly extending portions defining eyes in alignment with said tabs of said frame means, said tabs being received in locking engagement in said eyes.

6. An arrangement according to claim 5, wherein said eyes contact said surface of said board, whereby said eyes limit the insertion of said board and frame means in said casing shield.

7. An arrangement facilitating the fastening and contacting of a laminated conductor board in a shield casing, especially for structural component sub-assemblies in electrical communications and measuring technology, comprising a conductor board having at the soldering side thereof at least one narrow metalized strip serving as a ground connection, a relatively rigid shield casing having wall means disposed at the edges of said board, said casing being open at least at one side thereof with said conductor board extending thereacross, frame means supporting said conductor board in said shield casing disposed between said board and said casing, said frame means constructed of well-solderable sheet metal which is thin as compared with the thickness of the casing wall, said frame means having a first portion extending in the same direction as the adjacent casing wall and lying snugly thereagainst, said frame means having a second portion extending transversely to said first portion, said second portion engaging said metalized strip on said board, said second portion terminating in a flange extending obliquely back toward said adjacent casing wall and having an edge contact with said wall forming a solder receiving gap, fastening means interconnecting said frame to said shield casing, and solder joints conductively connecting said frame means to said casing and said metalized strip, whereby said frame means is soldered to said casing and strip by a flow solder process having a flow of solder parallel to a surface of said flange.

8. An arrangement according to claim 7, wherein said fastening means includes tabs on said frame means secured to said shield casing.

9. An arrangement according to claim 8, wherein said wall means of said casing includes inwardly extending strip portions forming eyes in alignment with said tabs of said frame, said tabs being received in and locked in said eyes with an upper surface of said board in contact with said eyes so that said eyes limit the insertion of said board and said frame into said casing.

10. An arrangement according to claim 7, wherein said frame means includes a third portion extending transversely to said first portion to define a frame means having a U-shaped cross section, said fastening means includes spot welded portions between said first portion and said wall means of said casing.

11. An arrangement according to claim 7, wherein said frame means includes a third portion extending transversely to said first portion, said third portion engaging a surface of said board opposite said solder side to define a frame means having a U-shaped cross section, said third portion being interrupted by upstanding tabs, said wall means of said casing having inwardly extending eyes in alignment with said tabs of said frame means, said fastening means comprising said tabs being received in locking engagement in said eyes.

12. An arrangement according to claim 11, wherein said eyes contact said surface opposite said solder side to limit the insertion of said board and frame means into said casing.

References Cited

UNITED STATES PATENTS

| | | | |
|---|---|---|---|
| 3,258,650 | 6/1966 | Fiege | 317—101 |
| 3,200,361 | 8/1965 | Schwartz et al. | 317—101 |
| 3,211,822 | 10/1965 | Krall et al. | 174—35 |
| 3,258,649 | 6/1966 | Arguin et al. | 317—101 |

DARRELL L. CLAY, *Primary Examiner.*